United States Patent [19]

Foroulis et al.

[11] Patent Number: 4,665,996

[45] Date of Patent: May 19, 1987

[54] METHOD FOR REDUCING FRICTION IN DRILLING OPERATIONS

[75] Inventors: Z. Andrew Foroulis, Mendham, N.J.; Yuh H. Tsao, Houston, Tex.

[73] Assignee: Exxon Production Research Company, Houston, Tex.

[21] Appl. No.: 846,531

[22] Filed: Mar. 31, 1986

[51] Int. Cl.$^4$ .......................... E21B 7/04; E21B 17/10
[52] U.S. Cl. ...................................... 175/61; 138/145; 175/409; 175/411
[58] Field of Search ................. 175/61, 320, 325, 409, 175/411; 138/145, 177

[56] References Cited

U.S. PATENT DOCUMENTS

| | | | |
|---|---|---|---|
| 3,250,578 | 5/1966 | Lubbes | 175/325 |
| 3,251,427 | 5/1966 | Ewing | 175/320 |
| 3,993,368 | 11/1976 | Jurgens et al. | |
| 4,043,611 | 8/1977 | Wallace | 175/325 |
| 4,156,374 | 5/1979 | Shwayder | |
| 4,245,698 | 1/1981 | Berkowitz et al. | |
| 4,277,108 | 7/1981 | Wallace | |
| 4,436,118 | 3/1984 | Garrett | |
| 4,467,879 | 8/1984 | Burge | |
| 4,554,130 | 11/1985 | Ecer | 419/8 |

OTHER PUBLICATIONS

"A User's Guide to Drill String Hardfacing", ASME Publication No. 83-PET-20, presented at the 6th Annual Energy-Sources Technology Conference and Exhibition, Houston, Texas (Jan. 31-Feb. 3, 1983).

"The Role of Molybdenum as an Alloy Element in Adhesive wear Resistance", by Z. A. Foroulis, appearing in Speciality Steels and Hard Materials, edited by N. R. Comins and J. B. Clark, Pergamon Press, Oxford, England (1983).

"Hardfacing", *Metals Handbook*, 9th Ed., vol. 6, *Welding Brazing and Soldering*, American Society for Metals: Metals Park, Ohio (1983).

*Primary Examiner*—George A. Suchfield
*Attorney, Agent, or Firm*—Hubert E. Cox

[57] ABSTRACT

Hardfacing the principal bearing surface of a drill pipe with an alloy having the composition of: 50–65% Cobalt, 25–35% Molybdenum, 1–18% Chromium, 2–10% Silicon and less than 0.1% Carbon reduces the friction between the drill string and the casing or rock. As a result, the torque needed for the rotary drilling operation, especially directional drilling, is decreased. The alloy also provides excellent wear resistance on the drill string while reducing the wear on the well casing.

22 Claims, No Drawings

METHOD FOR REDUCING FRICTION IN DRILLING OPERATIONS

FIELD OF THE INVENTION

This invention relates to a method for reducing friction during drilling operations and thereby reducing the horsepower requirements for rotary drilling operations. Specifically, this invention relates to the use of certain alloys as a hardface on the principal bearing surfaces of the drill string to reduce friction in rotary oil well drilling operations, especially directional drilling.

BACKGROUND OF THE INVENTION

In rotary drilling operations, a drill bit is attached to the end of a drill string which is rotated at the surface by a rotary table. The weight of the drill string causes the rotating bit to bore a hole in the earth. As the operation progresses, new sections of drill pipe are added to the drill string and increase its overall length. Periodically during the drilling operation, the open borehole is cased to stabilize the walls, and the drilling operation is resumed. As a result, the drill string usually operates both in the open borehole and within the casing which has been installed in the borehole.

The power to drill is transmitted through the drill string to the drill bit. The amount of power which can be transmitted is limited to the maximum torque a drill string can sustain.

During the drilling of a borehole through underground formations, the drill string undergoes considerable sliding contact with both the steel casing and rock formations. This sliding contact results primarily from the rotational and straight movements of the drill string in the borehole. Friction between the moving surface of the drill string and the stationary surfaces of the casing and formation creates considerable drag on the string and results in excessive torque during drilling operations. The problem caused by friction is inherent in any drilling operation, but it is especially troublesome in directionally drilled wells. Directional drilling is simply the intentional deviation of a wellbore from the vertical. In some cases the angle from the vertical may be as great as ninety degrees from the vertical. Such wells are commonly referred to as horizontal wells and may be drilled to a considerable depth and considerable distance from the drilling platform.

In all drilling operations, the drill string has a tendency to rest against the side of the borehole or the well casing, but this tendency is much greater in directionally drilled wells because of the effect of gravity. As the drill string increases in length or degree of vertical deflexion, the amount of friction created by the rotating drill string also increases. To overcome this increase in friction, additional power is required to rotate the drill string. In some cases, the friction between the drill string and the casing wall or borehole exceeds the maximum torque that can be tolerated by the drill string and drilling operations must cease. Consequently, the depth to which wells can be drilled using available directional drilling equipment and techniques is limited.

The most common methods for reducing the friction caused by the contact between the drill string and the well casing or borehole rely primarily on improving the lubricity of the drilling muds. It is generally agreed that bentonite helps reduce friction between the drill string and an open borehole. Diesel and other mineral oils are also often used as lubricants, but there is a problem with the disposal of the mud. Other additives include vegetable oils, asphalt, graphite, detergents and walnut hulls, but each has its own drawbacks.

One other common method for reducing the friction between the drill string and the well casing or borehole is to use aluminum drill string because aluminum is lighter than steel. However, the aluminum drill string is expensive, and it is not compatible with many types of drilling fluids (e.g. drilling fluids with high pH).

Still another problem encountered during drilling operations, especially directional drilling, is the wear on the casing and drill string that occurs when the metal surfaces contact each other. This abrasion between metal surfaces during the drilling of oil and gas wells results in excessive wear on both the drill string and the well casing. Presently, the preferred solution to reduce wear of drill strings is to hardface portions of the drill string. A tungsten carbide containing alloy, such as Stellite 6 and Stellite 12 (trademark of Cabot Corporation), has excellent wear resistance. Hardfacing protects the drill string, but it tends to cause excessive abrading of the well casing. This problem is especially severe during directional drilling because the drill string, which has a tendency to rest on the well casing, continually abrades the well casing as the drill string rotates. In addition, some of these hardfacing alloys, such as tungsten carbide, actually make the friction problem worse.

SUMMARY OF THE INVENTION

This invention is a method for reducing friction during drilling operations, especially directional drilling. This invention involves hardfacing at least part of the drill string with an alloy having the following composition: 50-65% Cobalt, 25-35% Molybdenum, 1-18% Chromium, 2-10% Silicon and less than 0.1% Carbon. Using this alloy to hardface a drill string will reduce the torque for drilling and allow the well to be drilled to a greater depth using conventional drilling equipment. In addition to reducing friction, the alloy used in this invention provides wear resistance for the drill string that is equal to or better than that obtained from alloys previously used in hardfacing drill pipe while reducing the wear on the well casing.

DESCRIPTION OF THE PREFERRED EMBODIMENTS

This invention is the discovery that friction between the drill string and the casing or rock can be reduced by hardfacing at least part of the drill string with an alloy having the following composition: 50-65% Cobalt, 25-35% Molybdenum, 1-18% Chromium, 2-10% Silicon and less than 0.1% Carbon.

The hardfacing must be applied to the principal bearing surface of the drill pipe over an area which is sufficient to provide adequate contact with the casing. The principal bearing surface is that part of the pipe having the largest diameter. In other words, the principal bearing surface is that part of the drill pipe which normally contacts the casing or rock. On a standard drill pipe the principle bearing surfaces are at the ends of the pipe joint.

Various techniques can be used to apply the hardface to the drill string components. At present, the two most commonly used methods are weld overlay and transfer plasma arc. Such techniques are commonly known to those skilled in the art. The preferred method for applying the hardface is the oxy-fuel method because it produces coatings with minimum defects. The coating should be applied to a thickness from about 0.010 inch to 0.5 inch, and preferably to a thickness from 0.125 inch to 0.250 inch.

While it is believed that any alloy having a composition within the specified range will function, the preferred alloys are Tribaloy 400 and Tribaloy 800 (trademark of Cabot Corp.) primarily because they are commercially available. Tribaloy 400 and 800 are Cobalt-Molybdenum based alloys having the following compositions, respectively: 62Co-28Mo-8Cr-2.6Si and 52Co-28Mo-17Cr-3.0Si. These preferred alloys have been suggested for use as hardfacing for various machine parts because they provide excellent wear resistance.

The preferred alloys and commonly used tungsten carbide containing alloys were tested for friction and wear properties. The tungsten carbide containing alloys were Stellite 6 and Stellite 12 which have the compositions 66Co-28Cr-4W-1.0C and 62Co-29Cr-8W-1.3C, respectively. The tests were performed using an alpha model LFW-1 testing machine according to the standard method for calibration and operation of the alpha model LFW-1 friction and wear testing machine, ANSI-ASTM D2714-68 (reapproved 1978).

Rotating rings were made of either AIS1 4137-H base steel or Type 304 SS surface coated with the various alloys, and stationary blocks were made from K55 casing steel. All of these materials are readily available. Friction tests were performed in 13 lbs. per gallon laboratory prepared fresh water drilling mud at 200 rpm and load of 200 lbs/inch. Wear testing was performed under the same conditions using 25,000 revolutions. Compositions of the coatings which were tested, and the test results are given in Tables 1 and 2.

TABLE 1

Effect of Surface Coatings on Friction Coefficient Between Steel Ring and K-55 Casing Steel Block

| Surface Coating on Ring | Friction Coefficient | Percent Improvement |
|---|---|---|
| None (A1S1 4137-H) | 0.22 | — |
| Stellite 6 (Type 304 SS) | 0.23 | — |
| Stellite 12 (Type 304 SS) | 0.22 | — |
| Tribaloy 800 (Type 304 SS) | 0.12 | 45 |
| Tribaloy 400 (Type 304 SS) | 0.12 | 45 |

TABLE 2

Effect of Surface Coatings on Wear between Steel Ring and K-55 Casing Steel Block*

| Surface Coating On Ring | Block Weight Loss, (mg) | Percent Reduction in Block Wear | Ring Weight Loss, (mg) | Percent Reduction in Ring Wear |
|---|---|---|---|---|
| None (A1S1 4137-H) | 74.3 | — | 119.0 | — |
| Stellite 6 (Type 304 SS) | 132.0 | 78 increase | 32.0 | 67 |
| Stellite 12 (Type 304 SS) | 53.5 | 27 | 19.5 | 84 |
| Tribaloy 800 (Type 304 SS) | 15.3 | 79 | 11.3 | 90 |
| Tribaloy 400 (Type 304 SS) | 13.2 | 82 | 6.4 | 94 |

*Tests were carried out in 13 lbs. per gallon laboratory prepared fresh water drilling mud and loading conditions of 200 lbs/inch, at 200 rpm and 25,000 total revolutions.

Tests were also conducted using rings made of 4140 steel. In these tests, the preferred alloys were applied over an intermediate buttering layer of 309 SS or Inconel 600 using the oxy-fuel (OF) method and the transfer plasma arc (TPA) technique. Using an intermediate buttering layer is a common welding technique, and it serves to minimize cracking in the substrate and carbon pick-up by the overlay coating. For comparison purposes, tests were run on uncoated 4137-H steel and Type 304 SS steel coated by the tungsted inert gas (TIG) method. The friction and wear tests were performed under the same conditions as the previous tests, and the results are given in Tables 3 and 4.

TABLE 3

Effect of Surface Coatings on Friction Coefficient between Steel Ring and K-65 Casing Steel Block

| Steel Ring/Buttering/Hardface/Procedure | Friction Coefficient | Percent Improvement |
|---|---|---|
| 4137-H/—/—/— | 0.24 | — |
| 304SS/—/T-400/TIG | 0.13 | 45 |
| 304SS/—/T-800/TIG | 0.12 | 50 |
| 4140/309/T-800/TPA | 0.14 | 42 |
| 4140/309/T-800/OF | 0.08 | 67 |
| 4140/309/T-400/OF | 0.07 | 71 |
| 4140/Inconel/T-800/TPA | 0.09 | 54 |
| 4140/Inconel/T-800/OF | 0.07 | 71 |
| 4140/Inconel/T-400/OF | 0.08 | 67 |

TABLE 4

Effect of Surface Coating on Wear between Steel Ring and K-55 Casing Steel Block*

| Steel Ring/Buttering/Hardface/Procedure | Block Weight Loss, (mg) | Percent Reduction in Block Wear | Ring Weight Loss, (mg) | Percent Reduction in Ring Wear |
|---|---|---|---|---|
| 4137-H/—/—/— | 144.5 | — | 99.7 | — |
| 304SS/—/T-400/TIG | 15.3 | 89 | 33.5 | 66 |
| 304SS/—/T-800/TIG | 10.0 | 93 | 14.0 | 85 |
| 4140/309/T-800/TPA | 36.0 | 75 | 33.8 | 66 |
| 4140/309/T-800/OF | 37.5 | 74 | 30.5 | 69 |
| 4140/309/T-400/OF | 53.5 | 63 | 36.8 | 63 |
| 4140/Inconel/T-800/TPA | 30.7 | 78 | 71.3 | 28 |
| 4140/Inconel/T-800/OF | 73.3 | 49 | 53.1 | 47 |
| 4140/Inconel/T-400/OF | 48.0 | 66 | 55.6 | 44 |

*Tests were carried out in 13 lbs. per gallon laboratory prepared fresh water drilling mud and loading conditions of 200 lbs/inch, at 200 rpm and 25,000 total revolutions.

The alloys Tribaloy 400 and Tribaloy 800 were also applied to full-scale tool joints for actual field testing. Three tool joints were each coated with four bands of alloy approximately ⅜-inch wide. The alloys and methods of application were as follows:

309 stainless buttering layer, Tribaloy 400, oxy-fuel method (340F)
    309 stainless buttering layer, Tribaloy 800, oxy-fuel method (380F)
    Inconel 600 buttering layer, Tribaloy 800, transfer plasma arc technique (I8TP)

Each of the hardbanded tool joints was run for approximately 150,000 revolutions (20 hours at 125 rpm). The test fluid was a 16.0-ppg water-base mud with 0.5 percent sand added. The K-55 casing sample was loaded against the rotating tool joint with 2,000 pounds side load. Comparison tests were run using a regular tool joint.

As shown in Table 5, six tests were run. Each of the three hardbanded joints was run tested to about 150,000 revolutions. This was followed by a comparison run with a regular tool joint. To eliminate hydrodynamic lubrication, the majority of revolutions in the tool-joint test (4) were logged at 15 rpm. Consequently, that test lasted 120 hours. For the fifth test, a regular tool joint was machined to leave four raised bands of approximately the same geometry as on the hardbanded joints. This 4-band joint was run at 125 rpm for about 150,000 revolutions. It ran in the hydrodynamic mode and was allowed to continue. The final test was a repeat of test one using the 340F hardband.

TABLE 5

|  | (1) 340F | (2) 380F | (3) I8TP | (4) Tool Joint | (5) 4-Band | (6) 340F Rerun |
|---|---|---|---|---|---|---|
| # of Revolutions | 145,000 | 150,000 | 147,000 | 158,000 | 146,000 | 146,000 |
| Total Time (hrs) | 20.8 | 21.4 | 21.4 | 120.0 | 21.7 | 20.4 |
| Final Casing Wear (in.) | .0717 | .0909 | .1096 | .0720 | .0917 | .0871 |
| Final Wear Volume (in.$^3$) | .488 | .655 | .791 | 1.176 | .574 | .647 |
| Wear Coefficient ($\times 10^{-4}$) | 0.98 | 1.16 | 1.49 | 2.03 | 1.72 | 1.37 |
| Avg. Frict. Coef. (Running) | .225 | .250 | .242 | .260 | .159* | .211 |
| 15 rpm, 2000# Frict. Coef. | .184 | .204 | .202 | .276 | .279 | .253 |

*Due to majority of test being run in hydrodynamic mode.

The three hardbanded tool joints all demonstrated lower friction coefficients and lower wear coefficients than those measured with the regular tool joint. Combining tests of similar materials, the following general observations can be made:

| Material | Low rpm Fric. Coef. | Average Wear Coef. ($\times 10^{-4}$) |
|---|---|---|
| Tribaloy 400 | 0.22 | 1.18 |
| Tribaloy 800 | 0.20 | 1.33 |
| Tool-Joint Steel | 0.28 | 1.88 |

The Tribaloy 400 demonstrated 20 percent lower friction coefficient and 40 percent lower wear coefficient than steel, and the Tribaloy 800 demonstrated 30 percent lower friction coefficient and 30 percent lower wear coefficient than steel.

Another significant observation was the absence of a hydrodynamic effect with the Tribaloy coatings. None of the alloys ran in the hydrodynamic mode. The steel tool joint (4) was expected to run hydrodynamic based on previous test experience. The 4-band steel (5) was designed to determine if contact area was a factor in the observed hydrodynamic effect. The surprising result was that this reduced contact area tool joint also ran hydrodynamic at 125 rpm. Furthermore, both steel tool joints showed good agreement in low rpm friction coefficients indicating no area effect. It is also interesting to note that the wear coefficient for both steel tests agree, indicating that the wear coefficient accurately accounts for contact area variations.

The foregoing description and embodiments are intended to illustrate the invention without limiting it thereby. It will be understood that various modifications can be made in the invention without departing from the spirit or scope thereof.

What is claimed is:

1. A method for reducing friction between a drill string and casing during a rotary drilling operation, comprising the steps of:
    adding drill pipe to said drill string, said drill pipe having at least part of the principal bearing surfaces hardfaced with an alloy comprising by weight percent from about 50 to about 65% Cobalt, from about 25 to about 35% Molybdenum, from about 1 to about 18%. Chromium, from about 2 to about 10% Silicon and less than 0.1% Carbon; and
    using said drill string in said drilling operation.

2. The method of claim 1 wherein said drilling operation is directional.

3. The method of claim 1 wherein said alloy is applied on said principal bearing surface to a thickness of from about 0.010 inch to about 0.50 inch.

4. The method of claim 3 wherein the thickness of said alloy is from about 0.125 inch to about 0.250 inch.

5. The method of claim 1 wherein said alloy has the composition of 62Co-28Mo-8Cr-2.6Si.

6. The method of claim 1 wherein said alloy has the composition of 52Co-28Mo-17Cr-3.0 Si.

7. The method of claim 1 wherein said alloy is applied to said principal bearing surface by an oxy-fuel method.

8. A method for reducing friction between a drill string and casing during a rotary directional drilling operation, comprising the steps of:
    adding drill pipe to said drill string, said drill pipe having at least part of the principal bearing surfaces hardfaced with an allow comprising by weight percent from about 50 to about 65% Cobalt, from about 25 to about 35% Molybdenum, from about 1 to about 18% Chromium, from about 2 to about 10% Silicon and less than 0.1% Carbon, said alloy being applied on said surface to a thickness of from about 0.010 inch to about 0.50 inch; and
    using said drill string in said drilling operation.

9. The method of claim 8 wherein the thickness of said alloy is from about 0.125 inch to about 0.250 inch.

10. The method of claim 8 wherein said alloy is applied to said principal bearing surface by an oxy-fuel method.

11. A method for reducing the torque during rotary drilling operations, comprising the steps of:
    adding drill pipe to a drill string, said drill pipe having at least part of the principal bearing surfaces hardfaced with an alloy comprising by weight percent from about 50 to about 65% Cobalt, from about 25 to about 35% Molybdenum, from about 1 to about 18% Chromium, from about 2 to about 10% Silicon and less than 0.1% Carbon; and using said drill string in said drilling operation, whereby, by reason of the reduction of friction between the principal bearing surfaces of said hardfaced drill pipe and the casing, the torque for performing rotary drilling is reduced.

12. The method of claim 11 wherein said rotary drilling operation is directional.

13. The method of claim 11 wherein said alloy is applied on said principal bearing surface to a thickness of from about 0.010 inch to about 0.50 inch.

14. The method of claim 13 wherein the thickness of said alloy is from about 0.125 inch to about 0.250 inch.

15. The method of claim 1 wherein said alloy has the composition of 62Co-28Mo-8Cr-2.6Si.

16. The method of claim 1 wherein said alloy has the composition of 52Co-28Mo-17Cr-3.0 Si.

17. The method of claim 11 where in said alloy is applied to said principal bearing surface by an oxy-fuel method.

18. A method for reducing the torque during rotary directional drilling operations, comprising the steps of:

adding drill pipe to a drill string, said drill pipe having at least part of the principal bearing surfaces hardfaced with an alloy comprising by weight percent from about 50 to about 65% Cobalt, from about 25 to about 35% Molybdenum, from about 1 to about 18% Chromium, from about 2 to about 10% Silicon and less than 0.1% Carbon, said alloy being applied on said surface to a thickness of from about 0.010 inch to about 0.50 inch; and using said drill string in said drilling operation, whereby, by reason of the reduction of friction between the principal bearing surfaces of said hardfaced drill pipe and the casing, the torque for performing rotary drilling is reduced.

19. The method of claim 18 wherein the thickness of said alloy is from about 0.125 inch to about 0.250 inch.

20. The method of claim 18 wherein said alloy is applied to said principal bearing surface by an oxy-fuel method.

21. The method of claim 18 wherein said alloy is applied to said principal bearing surface by a tungsten inert gas method.

22. The method of claim 18 wherein said alloy is applied to said principal bearing surface by a transfer plasma arc technique.

* * * * *